United States Patent

[11] 3,576,304

[72] Inventors George W. Gillemot
 2615 Naples Ave., Venice, Calif. 90291;
 John T. Thompson, 19201 Wells Drive,
 Tarzana, Calif. 91356
[21] Appl. No. 758,373
[22] Filed Sept. 9, 1968
[45] Patented Apr. 27, 1971

[54] MOUNTING ACCESSORY AND METHOD FOR MOUNTING TUBING AND CABLING
 1 Claim, 8 Drawing Figs.
[52] U.S. Cl............................................. 248/54,
 24/73, 24/204, 248/74, 248/205
[51] Int. Cl................................................ F16l 3/08
[50] Field of Search......................................... 248/54, 71,
 73, 74; 24/204, 73.7; 52/85

[56] References Cited
 UNITED STATES PATENTS
2,274,662 3/1942 Briggs........................... 52/85
3,008,273 11/1961 Widin........................... 52/85
3,370,818 2/1968 Perr............................. 24/204X
3,387,341 6/1968 Mates.......................... 24/204X
 FOREIGN PATENTS
 707,857 4/1965 Canada......................... 248/74
 950,228 2/1964 Great Britain................ 248/73

Primary Examiner—Chancellor E. Harris

ABSTRACT: A cable and tube mounting accessory conveniently extruded from flexible elastomeric material and having one or more generally C-shaped channels thereacross. The channels are sized to fit a cable or tube reasonably snugly after being deformed for the assembly operation. One exterior face of the accessory is preferably flat and equipped with one of a pair of separable interlocking strips one of which exhibits a multiplicity of barbs and the other a cooperating mass of intertwined fibers engageable with the barbs. The second strip is coated with adhesive, as a pressure sensitive type, for convenience in securing the same to any type of supporting surface, against which it is desired to support cabling, conductors, tubing or the like.

PATENTED APR 27 1971 3,576,304

INVENTORS.
GEORGE W. GILLEMOT
JOHN T. THOMPSON

MOUNTING ACCESSORY AND METHOD FOR MOUNTING TUBING AND CABLING

This invention relates to mounting accessories and more particularly to a simple, unique cliplike accessory formed of resilient, deformable material readily assembled by deformation over tubing, cabling and the like and equipped with a pair of interlocking strips adhesively attachable one to the accessory and the other to a supporting surface.

Various expedients have been proposed heretofore for mounting cabling, tubing, and electrical conductors to framing and along various types of surfaces but these have been attended with numerous shortcomings, disadvantages and objections sought to be avoided by the present invention. In general, these prior proposals are structurally complex and necessitate the use and installation of fastening devices. Equally disadvantageous is the fact that the openings required for the fastener devices deface the wall or other structure to which the mounting brackets are secured and consume labor in preparing the support to receive the fasteners.

By the present invention there is provided a simple, inexpensive accessory quickly and separably mountable against the supporting surface without need for tools or fastener devices other than the adhesively mounted pair of strips forming a part of the invention assembly. The accessory comprises an extruded length of elastomeric material having one or more C-shaped channels sized to seat the tubing or object to be supported. Along one or more exterior surfaces of the accessory there is adhesively attached one of a pair of interlockable mounting strips, the other strip being similarly securable to framing, a wall, floor, ceiling or other supporting surface. The adjacent surfaces of the two mounting strips are equipped one with barbs and the other with intertwined fibers engageable by the barbs. After the strips are secured to their respective surfaces the accessory and its load are readily secured in place by pressing the interlocking strip surfaces into mating relationship. The resiliency and deformable character of the accessory permits the load to be removed and reassembled without detaching the accessory from its support. Alternatively, the accessory, along with its load, may be detached from the main support strip and later reassembled thereagainst in the same manner as initially. Slits or notches spaced at close intervals along the accessory permit it to be flexed lengthwise around both inside and outside curves.

It is therefore a primary object of the present invention to provide a simple, rugged, inexpensive mounting accessory for cabling, tubing and the like detachably securable to any supporting surface without need for deforming or defacing the support surface.

Another object of the invention is the provision of a tube supporting accessory adapted to be extruded from elastomeric material for ready assembly about and disassembly from tubing and cabling and utilizing a pair of interlockable strip members for securing the accessory to a support surface.

Another object of the invention is the provision of a unique method of equipping cabling and tubing with supports at intervals and detachably securing these to a support surface without defacing the latter or the need for assembly tools.

These and other more specific objects will appear upon reading the following specification and claims and upon considering in connection therewith the attached drawings to which they relate.

Referring now to the drawings in which preferred embodiments of the invention are illustrated, FIG. 1 is a fragmentary perspective view showing a preferred embodiment of the invention in use;

Figure 1:
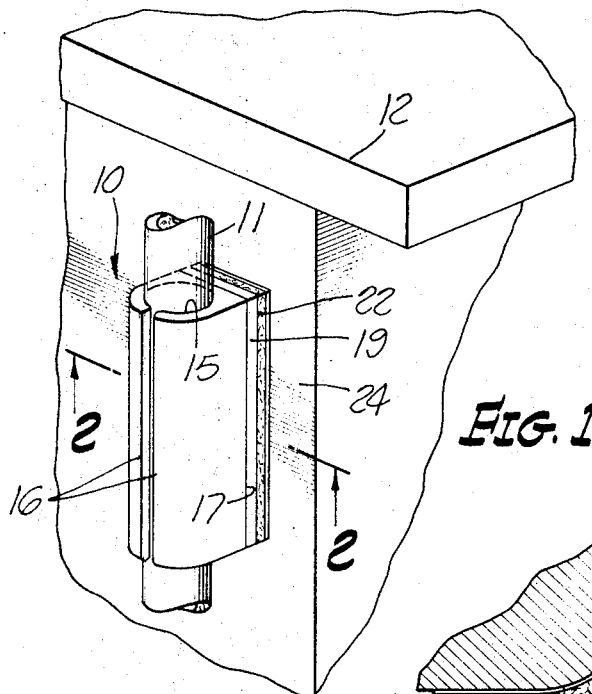
Figure 2:
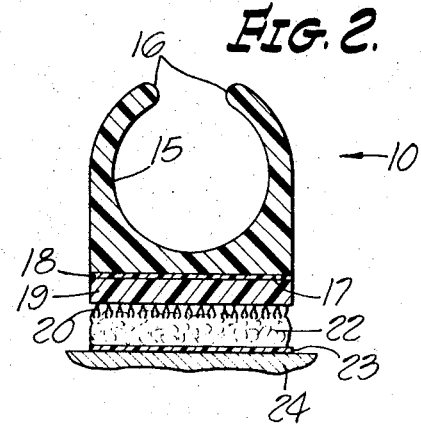
FIG. 2 is an enlarged cross-sectional view taken along line 2—2 on FIG. 1.

Referring initially more particularly to FIGS. 1 and 2, there is shown a first preferred embodiment of the invention, and designated generally 10, used to support a local telephone cable 11 against one end of a desk 12. Accessory 10 is extruded or molded in the general configuration shown from suitable elastomeric material, such as rubber or soft flexible thermoplastic composition, and is provided with a C-shaped channel 15 sized to snugly grip the tubing or cabling to be supported therewithin. The assembly operation is normally accomplished by spreading the lips 16, 16 to admit the load. One exterior face of the accessory is preferably flat, as is indicated at 17. Adhesively secured to this surface, as by a pressure sensitive layer 18, is the backing 19 of one of a pair of mounting strips for accessory 10. The outer surface of backing strip 19 supports a multiplicity of sharp flexible barbs 20 of any suitable type and designed to interlock tenaciously with a mat of intertwined fibers forming the main body of the mating strip 22. The underlying surface of the mat of fibers 22 is coated with a layer of adhesive 23, preferably of the pressure sensitive type protected until used by a film of wax paper. After this protector has been detached, the pressure sensitive layer can be pressed against and adheres tenaciously to any mounting surface, such as that indicated at 24 and here comprising one end wall of desk 12.

Preferably, mounting accessory 10, as purchased, includes a pair of separable strips 19, 22 the one strip 19 being already assembled to accessory 10, and the other strip 22 being interlocked with barbs 20. The accessory may be secured to the supporting surface before receiving the tubing or the latter may be inserted between lips 16 of channel 15 following which the backing strip is removed from adhesive layer 23. Thereupon the accessory is pressed against a supporting surface. The adhesive layer, if of the pressure sensitive type, can be peeled away from the supporting surface and remains substantially fully effective for reapplication to and reuse against another supporting surface. It may be attached against any type of surface including wood, masonry, cement, pain, metal, furniture finishes, and the like, without adverse affect on the surface finish. Any particles adhering to the surface after detachment of the main body layer can easily be rubbed or cleaned away.

It will, therefore, be apparent from the foregoing that the mounting accessory of this invention equally is adapted for use in the home, office, laboratory, or factory, and is highly effective in supporting cabling and tubing of all types against both rough and highly finished surfaces without marring, scratching, defacing or discoloring the surface finish. No holders, fasteners or tools are required and installation can be performed by the novice with excellent results.

Figure 4:
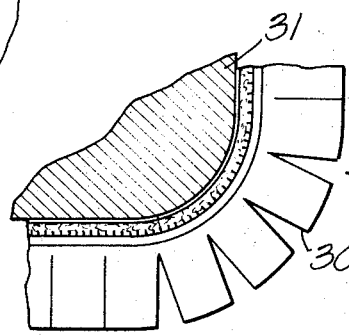
FIG. 4 is a fragmentary cross-sectional view showing the FIG. 3 embodiment supported on an outside curvate surface.
Figure 3:
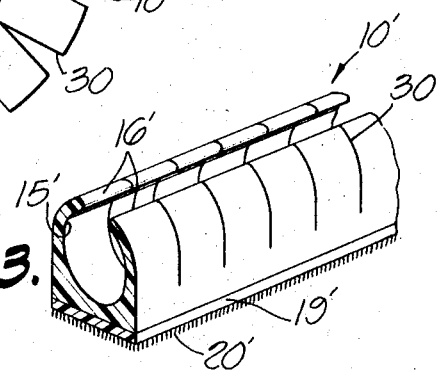
FIG. 3 is a fragmentary perspective view of a second preferred embodiment of the mounting accessory.
Figure 5:
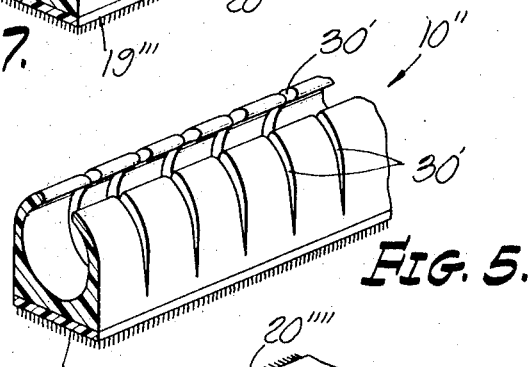
FIG. 5 is a perspective view similar to FIG. 3 showing the mounting accessory applied along an inside curve.
Figure 6:
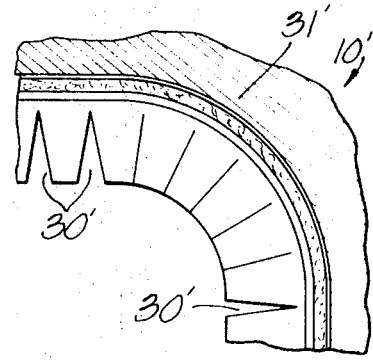
FIG. 6 is a view of the FIG. 5 embodiment installed along an inside curve.

The mounting accessory is readily mountable about either inside or outside curves by slitting or notching the appropriate sidewalls required to be expanded to accommodate the flushing or curve. FIGS. 3 and 4 show the accessory with closely spaced slits 30 in its sidewalls. These slits expand as necessary to accommodate the radius of an outside curve, such as that indicated at 31 in FIG. 4. FIGS. 5 and 6 are similar to FIGS. 3 and 4 but show the slits widened to form V-notches 30', as is necessary to accommodate an inside curve 31'.

Figure 7:
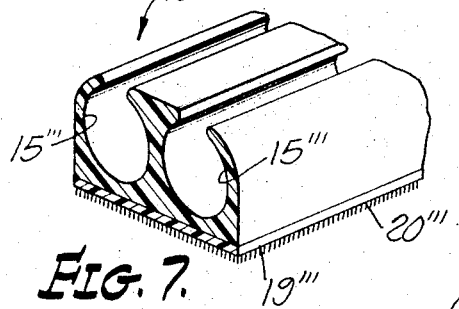
FIG. 7 is a fragmentary perspective view of a multichannel embodiment of the invention.

FIG. 7 shows a third embodiment of the invention formed with a plurality of object-seating or load-seating channels 15''. It will, or course, be understood that any number of channels may be formed in this or any of the other embodiments.

Figure 8:
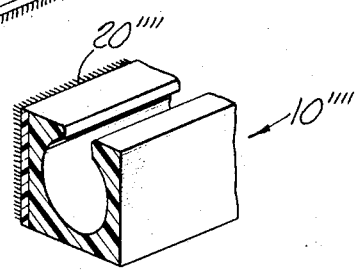
FIG. 8 is a fragmentary perspective view of still another embodiment.

FIG. 8 shows another variant wherein one of the pair of separable mounting strips 20'''' is bonded to one outer face of the C-shaped channel.

While the particular mounting accessory and method for tubing and cabling herein shown and disclosed in detail is fully capable of attaining the objects and providing the advantages hereinbefore stated, it is to be understood that it is merely illustrative of the presently preferred embodiments of the

We claim:

1. That method of securely but detachably mounting an elongated flexible length of cable and the like on furniture, a room wall, floor, ceiling or the like support surface irrespective of the metallic or nonmetallic nature thereof and without need for openings in the support surface, fastener devices, or tools and without risk of defacing the support surface, said method comprising: providing a plurality of similar C-shaped clips of resilient elastomeric material each having an elongated planar surface and a slotted opening parallel thereto sized to receive and grip the elongated cable therein, providing the opposite lateral sides of said C-shaped resilient clips with deep V-shaped notches to facilitate spreading the opposite sides of said clips away from one another to insert the cabling therebetween and to facilitate flexing said resilient mounting clips crosswise of the planar portion thereof in the direction and as necessary to mount said clips against an arched wall surface while the notched opposite sides of said clips remain parallel to one another and upright with respect to the adjacent surface of the room wall, assembling said clips at intervals along said elongated cable, applying the pressure sensitive coating on the back of one of a pair of separably interlocking mounting strips to said elongated planar surface of each of said clips and the similarly coated second one of said interlocking mounting strips to said supporting surface in juxtaposed relation to a respective different one of said clips and which pair of strips include on their respective adjacent faces interlocking barbs and a plaque of intertwined fibers and which mounting strips correspond in size with the elongated planar surface of said mounting clips whereby the juxtaposed barbed and fiber surfaces of said interlocking mounting strips are concealed from view when assembled to one another to support an elongated cable against a room wall, pressing the barbed face on successive ones of said clips into the fibered surface of the strip paired therewith thereby to support said elongated flexible cable at spaced intervals along and in conformity with said support surface irrespective of whether said surface is flat or curved inwardly or outwardly.